United States Patent [19]

Yang et al.

[11] Patent Number: 4,638,532

[45] Date of Patent: * Jan. 27, 1987

[54] MECHANICAL FASTENING SYSTEM

[75] Inventors: James H. C. Yang, Cleveland; Walter Tomaszewski, Canton, both of Ohio

[73] Assignee: The Firestone Tire & Rubber Company, Akron, Ohio

[*] Notice: The portion of the term of this patent subsequent to Aug. 13, 2002 has been disclaimed.

[21] Appl. No.: 724,054

[22] Filed: Apr. 18, 1985

Related U.S. Application Data

[63] Continuation of Ser. No. 516,622, Jul. 25, 1983, abandoned.

[51] Int. Cl.⁴ .................... A44B 21/00; E04B 1/00
[52] U.S. Cl. .................................... 24/462; 29/451; 52/512; 160/395
[58] Field of Search ............... 24/460, 462; 160/395, 160/397, 392, 394, 393; 52/222, 273, 512; 29/451, 453, 522 R

[56] References Cited

U.S. PATENT DOCUMENTS

| | | | |
|---|---|---|---|
| 166,059 | 7/1875 | Atha | 24/460 X |
| 1,484,382 | 2/1924 | Allitt | |
| 2,164,414 | 7/1939 | Long | |
| 3,681,887 | 8/1972 | Loew | |
| 3,757,479 | 9/1973 | Martinez | |
| 3,851,848 | 12/1974 | Wiele | |
| 3,893,212 | 7/1975 | Curry | 24/462 |
| 3,928,897 | 12/1975 | Tombu | 24/462 |
| 4,107,826 | 8/1978 | Tysdal | 160/395 X |
| 4,170,810 | 10/1979 | Peleg | |
| 4,189,880 | 2/1980 | Ballin | |
| 4,234,035 | 11/1980 | Babbs | |
| 4,534,145 | 8/1985 | Yung et al. | 160/395 X |

FOREIGN PATENT DOCUMENTS

| | | |
|---|---|---|
| 216192 | 7/1961 | Austria . |
| 2433669 | 1/1976 | Fed. Rep. of Germany . |
| 2529575 | 1/1977 | Fed. Rep. of Germany . |
| 952386 | 11/1949 | France . |
| 1467374 | 1/1967 | France . |
| 2263407 | 11/1975 | France . |
| 625463 | 2/1961 | Italy . |
| 7906086 | 2/1980 | Netherlands . |
| 597518 | 1/1948 | United Kingdom . |

Primary Examiner—Kenneth J. Dorner
Assistant Examiner—James R. Brittain
Attorney, Agent, or Firm—Ernst H. Ruf

[57] ABSTRACT

A mechanical fastening system for securing a flexible sheet within a channel member via an insert member wherein the latter is made of flexible resilient material having a central longitudinal flex notch that serves to define two adjacent wing portions and permits a temporary elastic deformation of the insert member into an inverted V-shape for insertion of the insert member, together with the flexible sheet, into the channel member. A method for securing the flexible sheet within the channel member, via the resilient insert member, is also presented.

22 Claims, 8 Drawing Figures

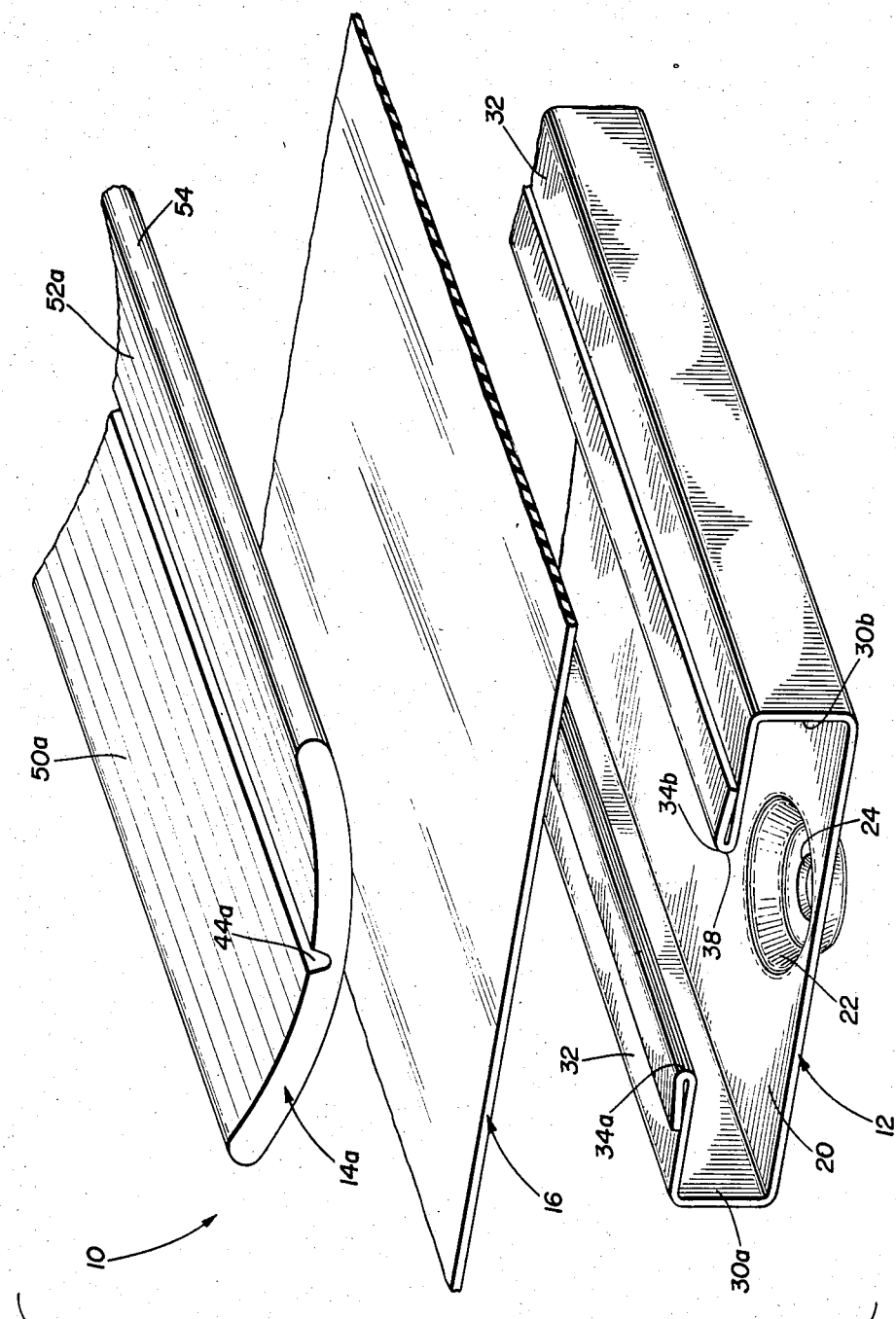
FIG. I 4,638,532

MECHANICAL FASTENING SYSTEM

This application is a continuation, of application Ser. No. 516,622, filed July 25, 1983 abandoned.

TECHNICAL FIELD

The field of art to which this invention pertains is that of mechanical fastening systems, particularly to an attachment device and method for mechanically securing a flexible sheet, without puncturing same, within a channel member via a flexible resilient insert member adapted for fixably retaining the sheet within the channel member.

BACKGROUND OF THE ART

A large number of commercial and factory or plant roofs are of a flat roof design wherein the roofing material itself is often of a built-up asphalt and, in more modern systems, of a single ply EPDM elastomeric sheet or membrane. In terms of securing a single ply EPDM membrane to the roof itself, one common design utilizes a mechanical ballast system that uses a layer of stone over the membrane. While the ballast system is least expensive, it has the disadvantage of being quite heavy (ten pounds per square foot) thus requiring a heavy roof support structure and, in addition, the roof slope cannot exceed 10°.

Adhered roof membrane retention systems suffer from a cost penalty while mechanical fastening systems generally require a fixation to the roofing substrate by metal fasteners with metal or rubberized nailing strips. Additional sealing strips or caps are then required to keep the punctured membrane water tight. Such installations are cumbersome as well as time-consuming in addition to violating the integrity of the membrane itself.

The prior art construction set forth in Netherlands Pat. No. 7,906,086 to Agro discloses a fixture arrangement for foil sheets for the erection of roof coverings and the like which comprises a rail with an approximately C-shaped profile. This rail has a smooth back and top and bottom grooves for a clamp frame which is flat on one side. The width of the frame is greater than the distance between the edges of the frame guide grooves in the rail and smaller or equal to the distance between the edge of the lower guide groove and the top of the uppermost guide groove.

French Pat. No. 2,263,407 to Hirota appears to disclose an apparatus for maintaining a soft sheeting member C on a structural greenhouse framework. This apparatus incorporates a substantially zig-zag spring which is positioned within a diverging channel of a retainer. The spring securely retains the flexible membrane C within this channel.

Austrian Pat. No. 216,192 to Fural appears to disclose a structure having a flexible membrane positioned thereon wherein the membrane extends over a reverse-tapered ridge and is maintained thereon by a fastening element which incorporates pivotally hinged members and a locking element wherein these members fit over the ridge and the flexible membrane.

U.S Pat. No. 4,170,810 to Peleg discloses an apparatus for securing a flexible sheet to building structures wherein, as best shown in FIG. 1, a substantially U-shaped channel member is used to receive the flexible membrane. Two engaging members are inserted into the channel member, over the flexible member, to tightly clamp the sheet against the channel member.

U.S Pat. No. 4,189,880 to Ballin discloses an apparatus for attaching a plastic film along the peripheral edge of the support frame by a spline. As best shown in FIGS. 5a and 5b, a plastic sheet is attached to a window by placing it within the channel member and after such placement a spline, preferably formed of a semi-rigid plastic material, is inserted into the channel. After insertion it forces the adjacent walls outwardly into a deformed position but once fully inserted (FIG. 5b) the member is securely held between the channel and the spline member.

U.S. Pat. No. 3,757,479 to Martinez discloses a device for holding a flexible sheet to a frame wherein the sheet is secured in a C-shaped rigid channel by a flexible and resilient strip having an initial inverted V-shape that has a longitudinal groove in its top surface. Upon installation the resilient strip is designed to assume a V-shape as it is wedged into its retaining channel.

French Pat. No. 1,467,374 to Buordelot appears to disclose a flexible strip with a groove thereon that apparently functions to facilitate entry into a rigid C-shaped channel to fixedly retain the strip therein.

U.S. Pat. No. 4,234,035 to Babbs in FIGS. 1 and 2 discloses a device for holding trim to upholstered furniture wherein a semi-rigid U-shaped member is attached to the chair and a contoured flexible strip is wedged thereinto. The strip utilizes a pair of ribs 13 that are spaced apart in order to give the strip a gap or track.

U.S. Pat. No. 3,681,887 to Loew discloses a decorative trim strip for an automobile. The strip in its natural state, i.e. before insertion into the recipient channel, appears to have a groove on the outer surface running longitudinally down the strip. Both the channel and the locking strip are composed of a flexible material.

U.S. Pat. No. 3,851,848 to Wiele discloses a device for attaching a flexible sheet to a rigid structure which can be used, for example, in awnings. The device incorporates a flexible locking strip having a groove thereon which enables a locking strip to hinge or bend inwardly.

German Patent Publication No. 2,433,669 pertains to a device for securing loosely placed roofing membranes wherein a cone-shaped base member is first attached to the roof and the membrane is secured between the base member and a top cap member yieldingly fitting into a restricted bore in the base member. A retaining member is then inserted into a central aperture of the cap member to secure the cap member to the base member.

DISCLOSURE OF THE INVENTION

The present invention provides a solution to the prior art problems and the previously-discussed prior art constructions by permitting attachment of a flexible sheet or membrane to a substrate or support without either press fitting or puncturing the membrane.

The attachment device of the present invention mechanically secures a flexible sheet or membrane to a channel member, having a central longitudinal slot, via a flexible, resilient insert member wherein the channel member is of a generally rectangular form in transverse cross-section.

The insert member utilized for retaining the flexible sheet is made of a flexible resilient material and has a central longitudinal flex notch in its top surface wherein the flex notch serves to define two adjacent wing portions that permit the temporary elastic deformation of the insert member into an inverted V-shape so as to allow insertion of the insert member, together with the flexible sheet, into the channel member.

The insert member may be of a generally rectangular form in a transverse cross-section but is preferably curved, concave in shape, in a transverse cross-section.

The insert member flex notch also acts as a hinge member after being inserted into the channel member so that, upon the application of tensile forces to the flexible sheet, the insert member tends to assume its free-state shape which in turn enhances its retention capabilities within the channel member.

Relationships pertaining to channel member and insert member dimensions are set forth together with ratios and several equations to fully define the invention.

The method for mechanically securing the flexible sheet within the channel member, via the flexible resilient insert member, includes the steps of temporarily elastically deforming the insert member into an inverted V-shape; placing the deformed insert member, together with the flexible sheet, through the channel member slot; and flattening the deformed insert member, thereby causing it to substantially return to its original shape so as to frictionally and yet non-bindingly retain the sheet within the channel member.

Other features and the advantages of the present invention will become more readily understood by persons skilled in the art when following the best mode description in conjunction with the several drawings.

BRIEF DESCRIPTION OF THE DRAWINGS

FIG. 1 is an exploded view, in enlarged perspective, of the mechanical fastening system of the present invention.

BEST MODE FOR CARRYING OUT THE INVENTION

Figure 2A:
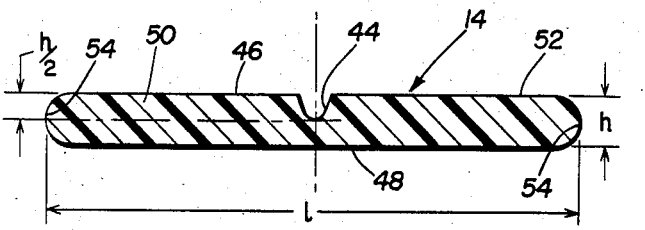
FIG. 2a is a cross-sectional view of the flat insert member of the present invention in its uninstalled or free form.

Referring now to the drawings, specifically FIG. 1, there is illustrated an exploded view, in enlarged perspective, of the attachment device 10 of the present invention. Attachment device 10, which basically includes channel member 12 and insert member 14, is utilized for securing a portion of a flexible sheet 16, interposed therebetween, in a manner to be described hereinafter.

Figure 3:
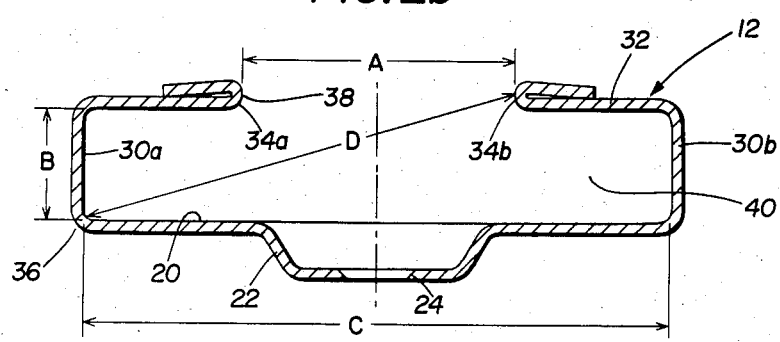
FIG. 3 is a cross-sectional view of the channel member of the present invention.
Figure 5:
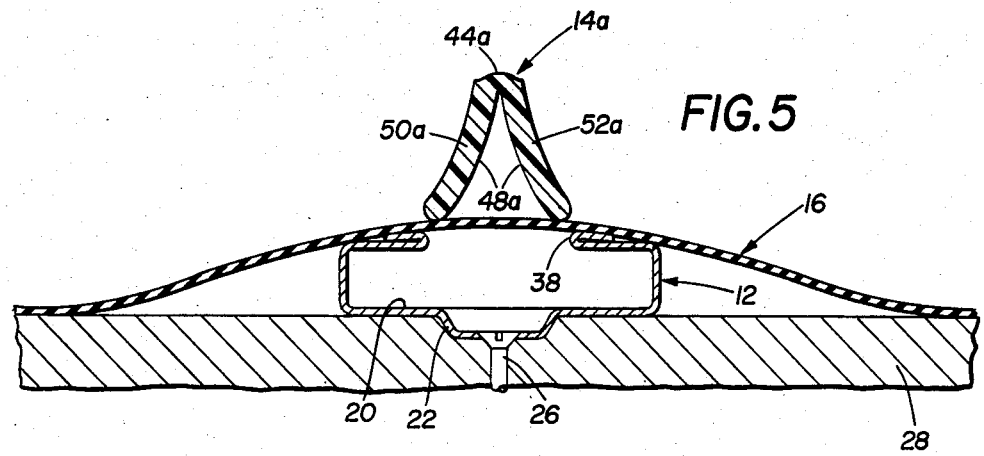
FIG. 5 is a cross-sectional view of the channel member, flexible sheet and insert member, wherein the flexible sheet extends over the channel member and the insert member has been deformed into an inverted V-shape to permit insertion thereof into the channel member.
Figure 6:
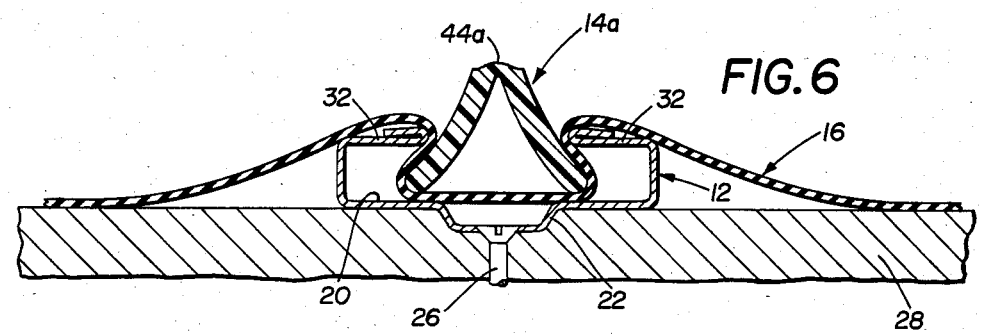
FIG. 6 is a view similar to that of FIG. 5 but showing the flexible sheet and insert member partially inserted within the channel member prior to pushing down the apex of the insert member.
Figure 7:
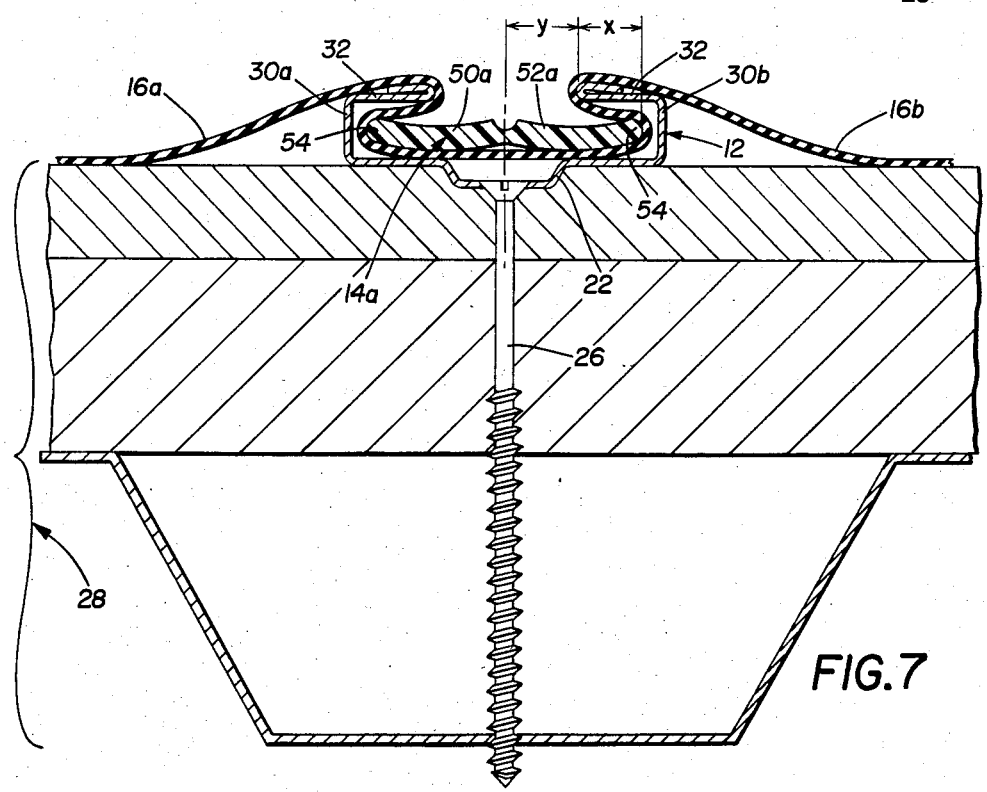
FIG. 7 is a view similar to FIG. 6 but showing the insert member fully inserted and securing the flexible sheet within the channel member.

Channel member 12, as best seen in FIGS. 1 and 3 and usually of a rigid, preferably metal construction, is of generally rectangular form in transverse cross section (see FIG. 3) having a substantially flat bottom wall 20 which in turn is provided with a plurality (one shown) of longitudinally spaced outwardly directed protrusions or recesses 22 that are provided with a central aperture 24, the latter permitting the partial passage therethrough of a fastener, such as 26, shown in FIGS. 5-7. The ends of channel bottom wall 20 merge into opposed, similarly projecting sidewalls 30a, 30b, which in turn merge into inwardly converging spaced top wall 32, parallel to bottom wall 20, whose opposite inner but spaced smooth edges 34a, 34b serve to define a constricted central longitudinal slot or opening 38.

The cross sectional area 40 within channel member 12 (excluding protrusions 22) as best seen in FIG. 3, can be defined as having a predetermined width C (between opposed walls 30a, 30b) a predetermined height B (between bottom and top walls 20, 32 respectively), with the opening in top wall 20 (slot 38) being of a predetermined width A.

Figure 4:
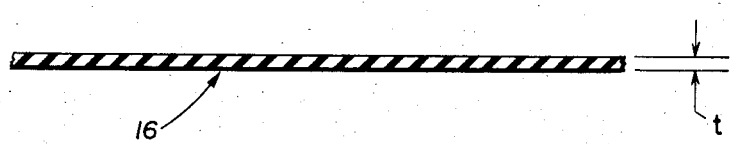
FIG. 4 is a cross-sectional view of the flexible sheet that is retained by the attachment device of the present invention.

In order to permit the insertion of sheet 16 into the interior of channel member 12, sheet 16 must be at least flexible and is preferably elastic. Sheet or membrane 16 may, for example as shown in FIG. 4, be EPDM (Ethylene Propylene Diene Monomer) roofing sheeting having a predetermined thickness t.

Figure 2B:
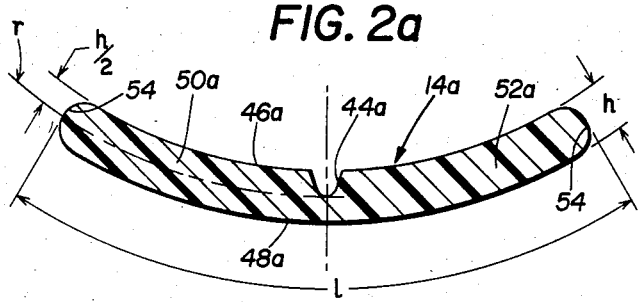
FIG. 2b is a view similar to that of FIG. 2a but showing the preferred curved insert member.

Turning now to insert member 14, best seen in FIGS. 1, 2a and 2b, it is preferably constructed of a flexible resilient material such as for example SENTOPRENE, 103-40, a thermoplastic rubber distributed by the Monsanto Company, Rubber Chemical Division, in Akron, Ohio. Other plastic, elastomeric or rubber-type materials can also be utilized. Insert member 14, which is either flat, i.e., of generally rectangular form in transverse cross-section (FIG. 2a) or preferably of generally curved form (FIG. 2b) in a transverse cross section, has a central longitudinal flex notch 44 on its top surface 46 that serves to define two adjacent substantially similar wing portions 50, 52. The depth of flex notch 44 is approximately one-half of the predetermined thickness h of insert member 14, with the ends 54, the latter being smoothly radiused into top and bottom surfaces 46, 48 respectively. The preferred radius of ends 14 is about one-half h.

The lateral or transverse extent of insert member 14 has a predetermined extent 1. As noted, FIG. 2a discloses insert member 14 that is generally flat in transverse cross-section, whereas FIG. 2b shows a preferred insert member 14a that is generally concavely curved in a transverse cross-section. To the extent that member 14a is the same as previously described member 14, reference is hereby made to this preceding description, with like reference numerals being followed by the suffix a. Naturally, top and bottom surfaces 46a, 48a, respectively are concave as are adjacent wing portions 50a, 52a and, the transverse extent 1 of course represents the arc length of member 14a. In addition, insert member 14a has a predetermined radius of curvature r.

Flex notch 44 not only serves to define the two adjacent wing portions 50, 52 but also permits the temporary elastic deformation of insert member 14 into an inverted V-shape for insertion of member 14, together with flexible sheet 16, into channel member 12 in the manner to be described with reference to FIGS. 5, 6 and 7.

Prior to the description relative to the insertion of insert member 14a and flexible sheet 16 into channel member 12, the relationships between previously discussed dimensions A, B, and C, are governed by the following equations: The nominal channel slot width (A) complies with the equation:

$$A = 21 - C - K_3 h \quad (1)$$

wherein:
 1 = nominal transverse extent of the insert member
 C = nominal channel width of the channel member
 h = nominal thickness of the insert member
 $K_3$ = In one example, the solving of equation (1) for $K_3$, using actual physical dimensions and the previously-noted SENTOPRENE material, the value of $K_3$ was determined to be 4.64.

The nominal channel height (B) complies with the equation:

$$B = h + 4t + K_1 \quad (2)$$

wherein:
 h = nominal dimensional thickness of the insert member.
 t = nominal thickness of the flexible sheet
 $K_1$ = dimensional manufacturing and clearance tolerances (such as for example 0.01/0.03")

The nominal channel width (C) complies with the equation:

$$C = 1 + 4t + K_2 \quad (3)$$

wherein:
 1 = nominal transverse extent of the insert member
 t = nominal thickness of the flexible sheet
 $K_2$ = dimensional manufacturing and clearance tolerances (such as for example 0.01/0.03").

With specific emphasis on curved insert member 14a, the preferred ratio of the radius of curvature to arc length of insert member 14a is about 0.9. Furthermore, the preferred ratio of the thickness to the transverse extent of insert members 14, 14a is about 0.09. As noted, the preferred ratio of the depth of the flex notch 44 to thickness t of members 14, 14a is about 0.5. In addition, the preferred ratio of the slot width (A) to the channel width (C) of channel member 12 is about 0.42. Further yet, the preferred ratio of the channel height (B) to the channel width (C) of channel member 12 is about 0.2; and the preferred ratio of the channel height (B) to the slot width (A) of channel member 12 is about 0.46. It should also be understood that dimension D, extending diagonally from the intersection 36 of sidewall 30a and bottom wall 20 to the smooth remote edge 34b of top wall 32, is less than the transverse extent (2) of insert members 14, 14a.

The relationship of channel member dimensions A, B and C is such that it will allow the insertion of not only a single sheet of flexible sheet 16 (which requires channel member 12 to accommodate a top and bottom layer of sheet 16 relative to wing portions 50a, 52a, as best seen in FIG. 7) but even of dual sheets which will of necessity provide two top and bottom layers of sheet 16 relative to the noted wing portions. Such a doubling can occur in the case of a lap splice between separate sheets 16, if such a splice falls within channel area 40, be it parallel with the longitudinal extent of channel member 12 or perpendicular thereto.

This is why in equation (2), namely $B = h + 4t + K_1$, pertaining to the nominal channel height (B), the multiplier 4 is used with factor t (nominal thickness of the flexible sheet). It is also within the scope of the invention to mechanically join two separate sheets 16 by overlapping same within at least a portion of the longitudinal extent of channel area 40, such as for example by overlapping such sheets in the area between insert member bottom surface 48 and channel bottom wall 20.

While the description relative to the method of mechanically securing sheet 16 in channel member 12, via an insert member, as depicted in FIGS. 5, 6 and 7, will be made with reference to curved insert member 14a, it should be understood that the same description is of course also applicable to flat insert member 14. Turning first to FIG. 5, it depicts channel member 12 attached to any desired type of substrate 28 (best shown in FIG. 7), such as a roofing structure, via a plurality of fasteners 26. After flexible sheet or membrane 16 is placed over channel member 12, curved insert member 14a is temporarily elastically deformed into an inverted V-shape by pressing wing portions 50a, 52a together wherein the bottom surface 48a defines the inner surface of the inverted V. Insert member 14a, in its inverted V-shape, together with sheet 16 is then pushed or placed vertically into channel member 12 through central longitudinal opening 38 until sheet 16 touches channel member bottom wall 20 as shown in FIG. 6. Thereafter pressure is applied downwardly against the now-deformed flex notch 44a (forming the apex of the inverted V) to flatten or return the insert member 14a from its inverted V-shape to approximately its natural shape—either substantially flat with reference to insert member 14 or to the concave shape of curved insert member 14a as shown in FIG. 7. The latter may also take the form of being slightly flattened in the center (see FIG. 7) wherein each one of wing portions 50a, 52a however substantially retains its previous radius of curvature. The important thing is that after insert member 14, 14a is received within channel member 12, that it must either remain substantially flat or slightly concave since a convex curvature can cause it to be ejected from channel member 12 upon the application of sufficient tensile forces, either parallel and/or perpendicular to top wall 32, on either one or both of fabric ends 16a, 16b.

It is thought that the mode of operation of insert member 14a, according to the invention, consists of the fact that when a tensile force acts at one of fabric ends 16a, 16b, either parallel to or perpendicular to top wall 32, this tensile force is transmitted, by insert member 14a, acting as a beam, to the opposite end 54 of insert member 14a to thereby press its associated portion of fabric 16 against the inner surface of channel member wall portion 30a, 30b. The frictional forces present between these parts, when in contact with each other, prevents fabric 16 from sliding out of channel member 12 after insert member 14a is inserted. If perpendicular or opposed parallel tensile forces are applied on both fabric ends 16a, 16b, insert member 14a is drawn upward so that fabric 16 is frictionally retained between member 14a and the inner surfaces of top wall 32 and bottom wall portion 48, in at least the area below notch 44a, will retain fabric 16 against bottom wall 20.

It should be understood at this time that since the transverse extent 1 of insert members 14, 14a is greater than dimension D of channel member 12, the former cannot be inserted into channel 12 diagonally even by itself let alone with the addition of sheet 16. Of course, the subsequent diagonal removal is therefore also not possible. It is important to note however that even in the case of a sheet lap splice falling within channel area 40 there is no press or interference fit as such of sheet 16 and insert members 14, 14a relative to channel member 12. As best seen in FIG. 7 there can be a limited amount of lateral and/or vertical shifting of sheet 16 and members 14, 14a, within member 12. Therefore, the noted retention is due to frictional forces, not interference or press fitting.

It is also important to note that insert member flex notch 44, 44a not only aids in the temporary elastic deformation of insert member 14, 14a but also acts as a hinge member, after insertion into channel member 12, upon the application of the previously-noted tensile forces, thereby causing members 14, 14a to assume even more pronounced generally flat (member 14) or greater concave (member 14a) shapes, which in turn will enhance their retention capabilities within channel member 12.

The mechanical fastening system of the present invention finds specific utility in mechanically securing EPDM sheeting in flat roofing applications. However, from foregoing description, when read in the light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An attachment device for mechanically securing at least one flexible elastomeric sheet to the upper surface of a roof, said attachment device comprising a substantially rigid channel member and an insert member for retaining at least one said elastomeric sheet within said channel member and over said roof, said channel member having a top wall, bottom wall, a rectangular cross-section, and a continuous central longitudinal slot in said top wall opening into said channel member, opposed side walls which are substantially flat and which are arranged in parallel, said side walls being substantially perpendicular to said top and bottom walls, and means for receiving a fastening element to attach the channel member to said upper roof surface, said receiving means being positioned within the bottom wall of said channel member and said channel member having a width which is defined by said opposed side walls, said insert member comprising cans for maintaining said at least one flexible elastomeric sheet in said channel member, said insert member being formed from a resilient material and having two outer arcuate edges which define between them a lateral extent less than the width of said channel member when said insert member is unflexed, said insert member also comprising a central longitudinal flex notch in one surface which defines two adjacent insert member wing portions and which comprises means for facilitating the temporary elastic deformation of said insert member from a first position in which said insert member has a substantially unflexed natural shape into a second position in which said insert member has a generally inverted V-shape so that said edges can be inserted, together with a portion of said at least one elastomeric sheet, through said slot and into said channel member, by deforming said insert member along said flex notch and without deforming said top wall or said side walls of said channel member, said insert member and said longitudinal flex notch together comprising means for maintaining said at least one elastomeric sheet against an interior surface of said channel member when said insert member is substantially flattened into a third position in which the shape of said insert member is returned approximately to said natural shape, thereby permitting lateral and vertical shifting of said insert member and said at least one flexible sheet within said channel member.

2. The attachment device of claim 1 wherein the opposite edges of said top wall, which define said central longitudinal slot are smoothly contoured.

3. The attachment device of claim 1 wherein said central longitudinal flex notch is in the top surface of said insert member.

4. The attachment device of claim 1 wherein said insert member is of generally rectangular form in a transverse cross section.

5. The attachment device of claim 1 wherein said insert member is of generally curved form in a transverse cross section.

6. The attachment device of claim 5 wherein the curved form of said insert member is concave in shape.

7. The attachment device of claim 6 wherein the ratio of the radius of curvature of said insert to the arc length of said insert member is about 0.9.

8. The attachment device of claim 1 wherein the ratio of the thickness of said insert to the transverse extent of said insert member is about 0.09.

9. The attachment device of claim 1 wherein the ratio of the depth of said flex notch to the thickness of said insert member is about 0.5.

10. The attachment device of claim 1 wherein the ratio of the slot width to the channel width of said channel member is about 0.42.

11. The attachment device of claim 1 wherein the ratio of the channel height to the channel width of said channel member is about 0.2.

12. The attachment device of claim 1 wherein the ratio of the channel height to the slot width of said channel member is about 0.46.

13. The attachment device of claim 1 wherein the nominal channel height (B) complies with the equation:

$$B = h + 4t + K_1$$

wherein:
h = nominal thickness of the insert member
t = nominal thickness of the flexible sheet
$K_1$ = dimensional manufacturing tolerance.

14. The attachment define of claim 1 wherein the nominal channel width (C) complies with the equation:

$$C = 1 + 4t + K_2$$

wherein:
1 = nominal transverse extent of the insert member
t = nominal thickness of the flexible sheet
$K_2$ = dimensional manufacturing tolerance.

15. The attachment device of claim 1 wherein said central longitudinal flex notch comprises a hinge when said insert member is subjected to tensile forces when in said second position.

16. An attachment device in accordance with claim 1 wherein said channel member comprises rigid metal.

17. The attachment device of claim 1 further comprising one elastomeric sheet which is securely maintained within said channel member when said insert member is in its third position.

18. The attachment device of claim 1 further comprising two elastomeric sheets having adjacent edge portions which are positioned within said channel member, both of said sheets being maintained within said channel member by said insert, said two elastomeric sheets overlapping within said channel member.

19. A method for mechanically securing at least one flexible elastomeric sheet to the upper surface of a roof by an attachment device which includes a channel member having a top wall, a bottom wall, a rectangular cross section, and a continuous central longitudinal slot in said top wall opening into said channel member, opposed side walls which are substantially flat and which are arranged in parallel, said side walls being substantially perpendicular with respect to said top and bottom walls, and means for receiving a fastening element to attach said device to said upper roof surface, said receiving means being positioned within said channel member and said channel member being substantially rigid and having a width which is defined by said opposed side walls, and an insert member formed from a flexible resilient material having two opposed arcuate edges defining a lateral extent forsaid insert member which is less than the width of said channel member when said insert member is unflexed, said insert member having a central longitudinal flex notch in one surface which defines two adjacent insert member wing portions, said method comprising:

(a) elastically deforming said insert member along said flex notch from a first position in which said insert member has a substantially unflexed natural shape into a second, flexed position in which it has a substantially inverted V-configuration;

(b) inserting said deformed insert member, together with said at least one elastomeric sheet, through said channel slot and at least partially into said channel member without deforming the top wall or the side walls of said channel member; and (c) flattening said deformed insert member along said flex notch to force said insert member to return substantially to its first position and to approximate said natural shape in order to frictionally maintain said at least one sheet within said channel member, thereby permitting lateral and vertical shifting of said insert member and said at least one flexible sheet within said channel member.

20. The method of claim 19 wherein said deforming and inserting steps are carried out substantially simultaneously.

21. The method of claim 19 wherein said flattening step consists of pressing on the apex of said deformed insert member.

22. A method accordance with claim 19 wherein said channel member comprises rigid metal.

* * * * *